L. A. THIELE.
CASCADE PAN.
APPLICATION FILED JULY 15, 1920.

1,380,689.

Patented June 7, 1921.

Ludwig A. Thiele

By
C. S. Sherd
Attorney

UNITED STATES PATENT OFFICE.

LUDWIG A. THIELE, OF COLUMBUS, OHIO.

CASCADE-PAN.

1,380,689.  Specification of Letters Patent.  Patented June 7, 1921.

Application filed July 15, 1920. Serial No. 396,565.

*To all whom it may concern:*

Be it known that I, LUDWIG A. THIELE, a citizen of the United States, residing at Columbus, in the county of Franklin and State of Ohio, have invented certain new and useful Improvements in Cascade-Pans, of which the following is a specification.

This invention relates to cascade pans of the type employed in the concentration of sulfuric acid and has for its object to provide a pan of such construction as to enable the same to form a unit of a plurality of similarly constructed and nested pans, which latter are adapted to be so arranged and constructed that the flow of acid from one to the other of the pans will assume the form of a relatively thin broad stream, which will be exposed to the large heat surfaces of the pan, whereby by so spreading the acid and providing the relatively great surface area therefor rapid and strong evaporation of the extraneous liquid components of the acid will be effected with but a minimum of working area and apparatus.

The invention consists in the provision of a pan of the aforesaid character, which is formed to comprise a body having an open top, vertical side walls and a deeply corrugated bottom, the walls being formed with guides disposed for the reception of a plurality of spaced baffle plates, which are so fixed as to lie between the upwardly extending corrugated portions of the bottom, the arrangement of parts being such that the acid flowing through the pan will be compelled to pass through the latter by a tortuous path, the latter being defined by the weaving of the acid around the spaced baffle plates and over the corrugations in the bottom of the pan.

Figure 1:
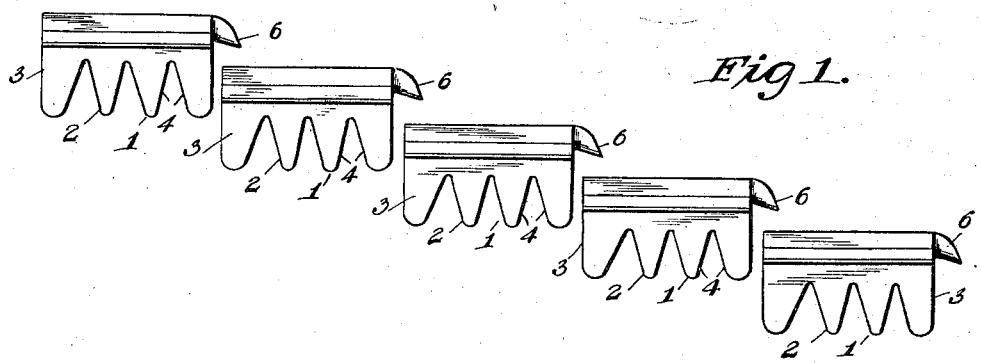
Figure 2:
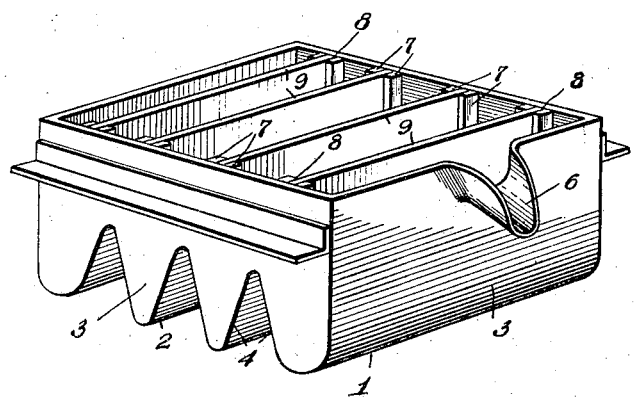
Figure 3:
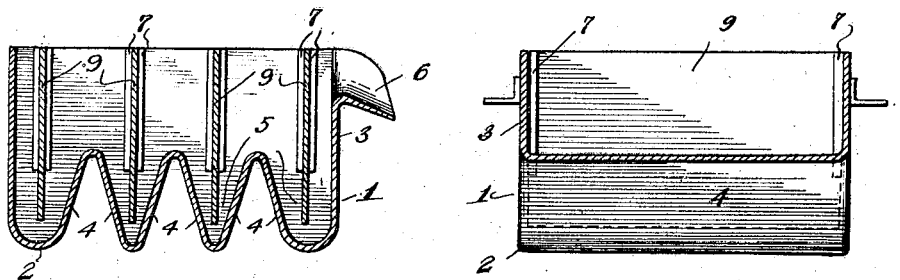
Figure 4:
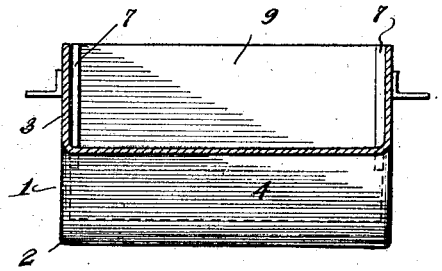

For a further understanding of the invention, reference is to be had to the following description and to the accompanying drawing, in which similar characters of reference denote like and corresponding parts throughout the several views thereof. In said drawing:

Figure 1 is a side elevation disclosing a plurality of the pans comprising the present invention in their assembled form, Fig. 2 is a perspective view of one of the pans, Fig. 3 is a vertical section taken through the pan, and Fig. 4 is a transverse vertical sectional view.

As shown in the accompanying drawing the present invention consists essentially in the provision of a peculiar type of cascade pan 1 primarily adapted for use in connection with the concentration of sulfuric acid. In Fig. 1 a plurality of these pans have been shown in assembled form, and it will be noted that the same are adapted to lie substantially end to end, and are located on an angle so that the acids introduced therein may flow from one pan to the other. As is common in concentration plants, these pans are so situated as to receive the benefit of heat derived from any suitable source, the heat being of a relatively intense character and of such nature and temperature as to evaporate the surplus liquid from the acid so that the residue discharged from the pans will be of a highly concentrated character.

In order to generally expedite this concentration process, to minimize working areas and to enable the process of concentration to be economically carried out, each of the pans 1 is formed to comprise a substantially hollow body, wherein is provided a deeply corrugated bottom 2, substantially vertical side walls 3 and an open top. It will be noted, upon reference to Fig. 3, that the corrugations within the bottom 2 are of such character as to provide a plurality of V shaped walls 4, between which similarly formed deep pockets 5 are provided. The front wall of the pan is provided with a centrally disposed outlet spout 6, which serves to regulate the heat of the acid within the pan, and to permit such acid to overflow into the next adjacent lower pan.

The side walls 3 at positions intermediate of the pockets 5 are provided with substantially vertical ribs 7, which form sockets 8 for the reception of baffle plates 9. These plates are so positioned as to extend transversely of the pan and are supported within the latter by reason of the rib and socket construction 7 and 8. It will be observed that owing to the positions of the plates 9, fluid introduced into the pan will be caused to travel in a sinuous or tortuous path through the pan in a relatively thin and wide stream. This effect is produced by extending the baffle plates 9 so that their lower edges will lie below the upper edges of the walls 4, so that the fluid will be prevented from collecting in any considerable volume within the pan.

This construction results in the provision of a pan for the purpose set forth wherein relatively extended heating surfaces are provided, or in other words the surfaces of the pan are of such character as to impart a maximum amount of heat radiation when the general area and volume of the pan are taken into consideration. This results in enabling the heat transmitted to the pans to quickly and rapidly evaporate the surplus liquid content of the sulfuric acid, and enables a highly concentrated solution to be produced with but a minimum of apparatus and in a short amount of time. It will be observed that the acid flows from the higher of the pans, as shown in Fig. 1, to the next lower pan, and this operation is successively repeated until the end of the apparatus is reached. By the provision of the baffles 9 the heating area of the pans is also augmented and the acid is caused to travel in the thin layer formation which will best produce the desired rapid evaporation.

What is claimed is:

1. A pan for use in the concentration of sulfuric acid comprising a body portion formed to include an open top, vertical side walls and a deeply corrugated bottom, and a discharge spout provided at one end of said pan.

2. A pan for use in the concentration of sulfuric acid comprising a hollow body portion formed to include an open top, substantially vertical side walls and a deeply corrugated bottom, baffles carried by the side walls of said pan and extended so that their lower edges will coöperate with the corrugations in the bottom of said pan, and a discharge element formed at the end of said pan.

3. A pan for use in the concentration of sulfuric acid comprising an open body portion formed to include an open top, substantially vertical side walls and a deeply corrugated bottom, guides carried by said side walls, baffles arranged to be received within said guides, said baffles having their lower edges positioned between the corrugations formed in the bottom of said pan, and a discharge spout for said pan.

In testimony whereof I affix my signature.

LUDWIG A. THIELE.